United States Patent
Hong et al.

(10) Patent No.: US 12,509,633 B2
(45) Date of Patent: Dec. 30, 2025

(54) COMPOSITION FOR SURFACE TREATMENT AND SURFACE TREATMENT METHOD USING THE SAME

(71) Applicants: Samsung Electronics Co., Ltd., Suwon-si (KR); FOOSUNG CO., LTD., Hwaseong-si (KR)

(72) Inventors: Hyeunwoong Hong, Suwon-si (KR); Woohyeop Kwon, Suwon-si (KR); Hyeongeun Ahn, Ulsan (KR); Wooin Jung, Suwon-si (KR); Dongkyeong Kang, Suwon-si (KR); Donghyun Kim, Ulsan (KR); Taeheon Kim, Ulsan (KR); Hyunjeong Kim, Suwon-si (KR); Changsu Lee, Suwon-si (KR); Kangyeob Jeon, Ulsan (KR); Jungheun Moon, Ulsan (KR); Chulhwan Moon, Ulsan (KR); Byungwon Woo, Ulsan (KR); Jungeun Lee, Ulsan (KR); Junhee Lee, Ulsan (KR); Taeseok Lee, Seongnam-si (KR); Hyejeong Jeong, Ulsan (KR); Kangsan Hong, Ulsan (KR); Soonkil Joung, Ulsan (KR)

(73) Assignees: SAMSUNG ELECTRONICS CO., LTD., Suwon-si (KR); FOOSUNG CO., LTD., Hwaseong-si (KR)

(*) Notice: Subject to any disclaimer, the term of this patent is extended or adjusted under 35 U.S.C. 154(b) by 158 days.

(21) Appl. No.: 18/333,154

(22) Filed: Jun. 12, 2023

(65) Prior Publication Data
US 2024/0076550 A1 Mar. 7, 2024

Related U.S. Application Data

(63) Continuation of application No. PCT/KR2023/007324, filed on May 26, 2023.

(30) Foreign Application Priority Data

Sep. 5, 2022 (KR) .................. 10-2022-0112393
Sep. 15, 2022 (KR) .................. 10-2022-0116373

(51) Int. Cl.
C09K 13/08 (2006.01)
C03C 15/00 (2006.01)

(52) U.S. Cl.
CPC .............. *C09K 13/08* (2013.01); *C03C 15/00* (2013.01)

(58) Field of Classification Search
None
See application file for complete search history.

(56) References Cited

U.S. PATENT DOCUMENTS

| | | |
|---|---|---|
| 3,284,181 A | 11/1966 | Harrell et al. |
| 6,194,365 B1 | 2/2001 | Lee |
| 8,722,189 B2 | 5/2014 | Fujii |
| 9,249,049 B2 | 2/2016 | Fujii |
| 10,205,478 B2 | 2/2019 | Fujii |
| 11,046,910 B2 | 6/2021 | Taniguchi et al. |
| 11,820,929 B2 | 11/2023 | Bjelopavlic et al. |
| 11,898,250 B2 | 2/2024 | Cordon et al. |
| 2004/0192063 A1* | 9/2004 | Koike .............. B24B 49/12 438/689 |
| 2012/0295087 A1 | 11/2012 | Gierens et al. |
| 2015/0075570 A1 | 3/2015 | Wu |
| 2022/0004230 A1* | 1/2022 | Kashima .......... G06F 1/1652 |
| 2023/0192536 A1* | 6/2023 | Cao .............. C03C 15/00 65/31 |

FOREIGN PATENT DOCUMENTS

| | | |
|---|---|---|
| CN | 1 306 912 A | 8/2001 |
| CN | 104 829 139 A | 8/2015 |
| CN | 104488068 B | 2/2019 |
| CN | 111 285 378 A | 6/2020 |
| CN | 112777941 A | 5/2021 |
| EP | 2430482 B1 | 1/2013 |
| JP | 2002-316842 A | 10/2002 |
| JP | 5356576 B2 | 9/2013 |
| JP | 2017081767 A * | 5/2017 |
| KR | 100248113 B1 | 3/2000 |
| KR | 10-2012-0125269 A | 11/2012 |
| KR | 10-1512213 B1 | 4/2015 |
| KR | 10-2015-0113621 A | 10/2015 |
| KR | 101661278 B1 | 9/2016 |
| KR | 10-1796587 B1 | 11/2017 |

OTHER PUBLICATIONS

International Search Report and Written Opinion issued on Sep. 4, 2023 in International Patent Application No. PCT/KR2023/007324 filed on May 26, 2023.

Extended European Search Report dated May 23, 2025 for EP Application No. 23863301.0.

* cited by examiner

*Primary Examiner* — Shamim Ahmed
(74) *Attorney, Agent, or Firm* — Nixon & Vanderhye P.C.

(57) ABSTRACT

A composition for surface treatment includes fluorosilicic acid ($H_2SiF_6$) and hydrofluoric acid (HF), and/or a surface treatment method using the same. The composition may be used to treat (e.g., etch) a substrate such as glass or the like.

12 Claims, No Drawings

COMPOSITION FOR SURFACE TREATMENT AND SURFACE TREATMENT METHOD USING THE SAME

CROSS-REFERENCE TO RELATED APPLICATIONS

This application is a continuation application of International Application No. PCT/KR2023/007324 designating the United States, filed on May 26, 2023, in the Korean Intellectual Property Receiving Office, which claims priority from Korean Patent Application Nos. 10-2022-0112393, filed on Sep. 5, 2022, and 10-2022-0116373, filed on Sep. 15, 2022, in the Korean Intellectual Property Office, the disclosures of which are all hereby incorporated by reference herein in their entireties.

BACKGROUND

Field

Certain example embodiments relate to a composition for surface treatment and/or a method for surface treatment using the same.

Description of Related Art

Thanks to technological advances, electronic devices, such as smartphones and tablet PCs, are becoming increasingly thin. Further, consumers are demanding larger screens and higher screen-to-body ratios for electronic devices in terms of aesthetics, so the entire surface of the device is increasingly made of glass.

Glass has long been used as a front cover window material for displays due to its high light transmittance. However, since ordinary glass is vulnerable to external impacts and may easily break or scratch, it is desirable to adopt tempered glass with improved mechanical strength to form the front surface of electronic devices, such as smartphones.

Meanwhile, there is recent ongoing research on foldable displays and rollable displays, and electronic devices with these specialized displays are being released.

To realize foldable displays and the like, flexible materials, e.g., plastic materials, such as of polyimide film, are sometimes adopted for cover windows for displays instead of glass. However, polyimide films or so have lower light transmittance than glass, which may cause light loss. Further, foldable displays may suffer from cracks and permanent crease marks where the fold line is formed, as the cover window is repeatedly folded in a certain position.

In this regard, there is a need to develop ultra-thin glass (UTG) that has high mechanical strength and may be applied to specialized displays such as foldable displays or rollable displays. Ultra-thin glass generally refers to, for example, a glass material with a physical thickness of 100 μm or less. Ultra-thin glass has a higher light transmittance than plastic materials, and its thinness may make fold lines less visible, and it may even be bent, rolled, and/or folded.

However, ultra-thin which is too thin may be broken during processing. This results in lower yields of ultra-thin glass, which may drive up the price of ultra-thin glass. For this reason, various studies have been conducted to improve the physical and chemical strength of ultra-thin glasses, and there is a need to develop surface treatment compositions that improve etching speed and enable uniform etching.

SUMMARY

Certain example embodiments relate to a composition for surface treatment that can improve surface treatment speed and/or enable uniform treatment of a surface of an article to be treated, and/or a surface treatment method using the composition.

An example embodiment provides a composition for surface treatment comprising fluorosilicic acid ($H_2SiF_6$) and hydrofluoric acid (HF), wherein the value calculated by Equation 1 below is 0.8 or more.

$$Si_{hydro}/Si_{total} \quad \text{[Equation 1]}$$

In Equation 1, $Si_{total}$ content (ppm) of silicon (Si) in the composition, and $Si_{hydro}$ is a content (ppm) of silicon (Si) derived from the fluorosilicic acid.

Another example embodiment provides a method of surface treatment including contacting the above-described surface treatment composition with a substrate. Another example embodiment provides a method of surface treatment including contacting the above-described surface treatment composition with a substrate. The method according to an example embodiment relates to etch glass using a composition for surface treatment, and the method comprising: providing the composition, wherein the composition comprises: fluorosilicic acid (H2SiF6); and hydrofluoric acid (HF), wherein a value calculated by Equation 1 above is 0.80 or more; and contacting the composition with a glass substrate in etching the glass. In method for surface treatment according to an example embodiment, wherein the content of the fluorosilicic acid ($H_2SiF_6$) in the composition is from about 20 wt % to 60 wt % with respect to the total composition.

The composition for surface treatment according to an example embodiment may enhance the surface treatment speed.

Further, the composition for surface treatment according to an example embodiment enables uniform treatment of the surface of the article to be treated.

DETAILED DESCRIPTION

Example embodiments will be described below in more detail.

An example embodiment provides a composition for surface treatment for glass, comprising fluorosilicic acid ($H_2SiF_6$); and hydrofluoric acid (HF), wherein the value calculated by Equation 1 below is at least 0.8.

$$Si_{hydro}/Si_{total} \quad \text{[Equation 1]}$$

In Equation 1, $Si_{total}$ is the total content (ppm) of silicon (Si) in the composition, and $Si_{hydro}$ is the content (ppm) of silicon (Si) in the composition derived from the fluorosilicic acid.

Further, the composition for surface treatment according to an example embodiment may enhance surface treatment speed and/or enable uniform treatment of the surface of the article to be treated.

In an example embodiment, the fluorosilicic acid ($H_2SiF_6$) is a component included in the composition for surface treatment, together with at least hydrofluoric acid (HF), and may serve as a kind of buffer to replenish the hydrofluoric acid consumed when treating the surface of the article to be treated (e.g., see formula below). In this case, the consumed hydrofluoric acid may be regenerated so that the concentration of hydrofluoric acid in the composition may be maintained and the surface treatment capability of the composition remain high.

$$H_2SiF_6 \rightarrow 2HF + SiF_4$$

In an example embodiment, hydrofluoric acid (HF) may be a main component for treating the surface of the article (e.g., glass) to be treated. For example, when etching glass, the reaction occurs, consuming HF as shown in chemical formula 1 below.

$$4HF + SiO_2 \rightarrow SiF_4(gas) + 2H_2O \quad \text{[Chemical formula 1]}$$

In an example embodiment, the value calculated by Equation 1 below may be at least 0.8.

$$Si_{hydro}/Si_{total} \quad \text{[Equation 1]}$$

In Equation 1, $Si_{total}$ is the total content (ppm) of silicon (Si) in the composition, and $Si_{hydro}$ is the content (ppm) of silicon (Si) in the composition derived from the fluorosilicic acid.

The value calculated by Equation 1 above indicates the percentage (%) of silicon (Si), derived from fluorosilicic acid, in the composition. As mentioned above, fluorosilicic acid ($H_2SiF_6$) is a component that regenerates consumed hydrofluoric acid to maintain the concentration of hydrofluoric acid in the composition at a constant or substantially constant level, and is preferably included in the surface treatment composition. However, if the composition includes silicon-containing impurities such as an oxide of silicon (e.g., $SiO_x$ and/or $SiO_2$), the etching performance of the composition may be impaired, so it is preferable that the content of the silicon-containing impurities is low. In other words, Equation 1 may refer to the proportion of silicon (Si) derived from (e.g., pure) fluorosilicic acid, excluding silicon derived from the silicon-containing impurities, in the composition.

In an example embodiment, the value calculated by Equation 1 may be any one of 0.8 or more, 0.85 or more, 0.89 or more, 0.95 or more, or 0.99 or more. The higher the value calculated by Equation 1, the more desirable it is, so the upper limit is not particularly limited, but may be 0.99999 or less in certain example embodiments.

In an example embodiment, at least some of the silicon-containing impurities (e.g., $SiO_x$) may be removed by reacting the initial composition with HF as shown in chemical formula 1. The initial composition may contain a large amount of silicon-containing impurities for example, resulting in Equation 1 measuring 0.8 or less. According to an example method of preparing the composition, the silicon-containing impurities may be separated and removed in the form of $SiF_4$ (gas), for example, by reacting the initial composition containing the silicon-containing impurities with at least HF. Accordingly, in certain example embodiments, the total content (ppm) of silicon in the final composition may be less than the total content (ppm) of silicon in the initial composition, and as a result, Equation 1 of the final composition may be 0.8 or more, 0.85 or more, 0.89 or more, 0.85 or more or 0.99 or more.

In an example embodiment, a silicon-containing impurity refers to all other materials containing silicon (Si) other than fluorosilicic acid ($H_2SiF_6$). The silicon-containing impurity may be present in the form of, for example, one or more of $SiH_4$, $Si_2H_6$, $SiO$, $SiO_2$, $H_2SiO_3$, $Si(OH)_4$, $SiF_2$, or $SiF_4$. For example, if the silicon impurity is of or includes silicon oxide ($SiO_x$), it may react with HF in the silicon oxide state to produce fluorosilicic acid, and react with water to form $H_2SiO_3$, $Si(OH)_4$ which may react with HF, impairing etching performance (e.g., see chemical formula 2 below). It may also act as particles that may stick to the glass surface and interfere with etching, so it's important to keep the content low.

$$SiO_2 + H_2O \rightarrow H_2SiO_3 \quad \text{[Chemical formula 2]}$$

$$H_2SiO_3 + H_2O \rightarrow Si(OH)_4$$

$$H_2SiO_3 + 6HF \rightarrow H_2SiF_6 + 3H_2O$$

$$Si(OH)_4 + F^- \rightarrow Si(OH)_3F + OH^-$$

In an example embodiment, x of the silicon oxide ($SiO_x$) may satisfy $0 < x \leq 2$, and for example, x may be 2 in certain instances.

In an example embodiment, $Si_{total}$ of Equation 1 may be the total content (ppm) of silicon (Si) in the composition, as measured by inductively coupled plasma (ICP) luminescence analysis for example. The measuring technique may be KS M 1804 (Test Method for Hydrofluoric Acid for Semiconductors) or KS M 8003 (Code of Practice for High Purity Reagents), and the analytical instrument may be a PerkinElmer Avio 500 ICP Optical Emission Spectrometer, for example.

In an example embodiment, $Si_{hydro}$ is the content (ppm) of silicon (Si) derived from the fluorosilicic acid, which may be calculated by Equation 2 below.

$$Si_{hydro} = \{\text{Content of fluorosilicic acid in the composition}(\%)\} * \text{Si atomic weight/molecular weight of fluorosilicic acid } (H_2SiF_6) \quad \text{[Equation 2]}$$

For example, the atomic weight of Si is 28.0855 and the molecular weight of fluorosilicic acid is 144.09 and, based thereupon, Equation 2 above may be calculated.

In an example embodiment, the content of the fluorosilicic acid ($H_2SiF_6$) may be from about 20 wt % to 60 wt %, 30 wt % to 50 wt %, or 35 wt % to 45 wt %, with respect to the total composition. In other words, fluorosilicic acid ($H_2SiF_6$) may make up from about 20 wt % to 60 wt %, more preferably from about 30 wt % to 50 wt %, and/or most preferably from about 35 wt % to 45 wt % of the total composition for surface treatment. When the above range is satisfied, the buffer role described above may be sufficiently exerted, the viscosity of the composition may be kept low so that processability may be improved, the etch rate may be kept excellent, and/or the surface of the article to be treated may be treated uniformly.

In an example embodiment, the content of the hydrofluoric acid (HF) may be 0.1 wt % to 1 wt %, 0.15 wt % to 0.8 wt %, or 0.2 wt % to 0.7 wt %, with respect to the total composition. In other words, the hydrofluoric acid (HF) may make up from about 0.1 wt % to 1 wt %, more preferably from about 0.15 wt % to 0.8 wt %, and most preferably from about 0.2 wt % to 0.7 wt % of the total composition for surface treatment. When the above numerical range is satisfied, the etch rate may be maintained and/or the surface of the article (e.g., glass) to be treated may be treated uniformly.

In an example embodiment, the silicon-containing impurity content (e.g., $SiO_x$) may be 0.2 wt % or less, or 0.1 wt % or less, with respect to the total composition. When the above numerical range is satisfied, the etch rate may be maintained and/or the surface of the article to be treated may be treated uniformly.

In an example embodiment, the composition for surface treatment may include an inorganic acid(s). The inorganic acid(s) may function to create an acidic environment in the composition, for etching of the etched article.

In an example embodiment, the pH of the composition for surface treatment may be from about 2 to 6.5, more preferably from about 2 to 6, and most preferably from about 2 to 5. When the above range is met, the etch rate may be kept high. The type and/or content of the inorganic acid may be adjusted as described below to meet the above pH range.

In an example embodiment, the content of the inorganic acid(s) may be 1 wt % or less, 0.9 wt % or less, or 0.8 wt % or less, with respect to the total composition. When the above range is met, the pH range described above may be achieved.

In an example embodiment, the inorganic acid may include a first inorganic acid of or including sulfuric acid. The sulfuric acid may increase the boiling point of the composition, thereby enhancing the etchability of the composition.

In an example embodiment, the inorganic acid may include a second inorganic acid selected from the group consisting of nitric acid, hydrochloric acid, and phosphoric acid. This may or may not be used in combination with the first inorganic acid.

In an example embodiment, the composition for surface treatment may further include one or more compounds selected from the group consisting of: ammonium fluoride, ammonium bifluoride, tetrafluoroboric acid, hexafluorosilicic acid, tetrafluoroborate, ammonium hexafluorosilicate, ammonium hexafluorotitanate, tetramethyl ammonium fluoride, tetraethyl ammonium fluoride, tetrapropyl ammonium fluoride, tetrabutyl ammonium fluoride, tetrapenthyl ammonium fluoride, and tetraalkyl ammonium fluoride.

An example embodiment provides a method of surface treatment including contacting the above-described surface treatment composition with a substrate.

In an example embodiment, the substrate may be of or include glass. The glass comprises silicon dioxide ($SiO_2$), which is an etchable material for the composition for surface treatment described above. The glass may include other elements known in the art such as soda and/or lime, and may include impurities such as iron and/or small amounts of colorants.

In an example embodiment, the glass may have a physical thickness of at least 20 μm and no more than 300 μm. The thickness of the glass is a thickness suitable for protective glass for flexible or foldable devices such as cellular phones, tablets, etc., and the durability and flexibility of the glass may be improved when the above range is satisfied.

In an example embodiment, etching the substrate may be included.

In an example embodiment, etching the substrate may be performed in a temperature range from about 10° C. to 40° C., more preferably in a temperature range from about 15° C. to 25° C. In the above-described range, damage to the substrate may be prevented or reduce, and/or an excellent etch rate may be maintained.

In an example embodiment, the etch rate represented by the following Equation 3 in etching the substrate may be from about 0.1 to 1 μm/min. When the above numerical range is satisfied, the etching speed is excellent and/or the quality of the etched article may remain high.

etch rate=(etched depth of substrate etched in etching direction)/(etch time)  [Equation 3]

In Equation 3,
the depth of the substrate etched in the etching direction is the difference between the thickness of the substrate before etching and the thickness of the substrate after etching. Here, the etched depth may be expressed in μm, and the etch time in minutes.

In an example embodiment, etching the substrate may have an etch rate deviation of 5% or less as represented by the following Equation 4.

etch rate deviation={(early etch rate−late etch rate)/ (early etch rate)}/(early etch rate)*100(%)  [Equation 4]

In Equation 4 above,
the early etch rate is the etch rate, 10 minutes after the substrate etching starts,
the late etch rate is the etch rate, 120 minutes after the substrate etching starts.

Hereinafter, the disclosure will be described in more detail by way of certain example. However, the scope of the disclosure is not limited to the following examples.

Experimental Method: Etch Rate Measurement Method

Experimental Example 1

Preparation of Embodiment and Comparative Example

Embodiment 1

A composition for surface treatment was prepared that contained 40 wt % fluorosilicic acid ($H_2SiF_6$) and 0.38 wt % hydrofluoric acid (HF) with respect to the total composition. The composition according to embodiment 1 was prepared by adding hydrofluoric acid (HF) to the initial composition to reduce the content of silicon oxide impurities (e.g., $SiO_x$) in the composition to 0.2 wt % or less, or 0.1 wt % or less. At this time, the purity of the fluorosilicic acid in the composition was 41.76 wt % of the total composition.

Embodiment 2

A composition for surface treatment was prepared in the same manner as in embodiment 1, except that the content of each component was changed as shown in Table 1 below. At this time, the purity of the fluorosilicic acid in the composition was 41.92 wt % of the total composition.

Embodiment 3

A composition for surface treatment was prepared in the same manner as in embodiment 1, except that the content of each component was changed as shown in Table 1 below. At this time, the purity of the fluorosilicic acid in the composition was 41.6 wt % of the total composition.

Embodiment 4

A composition for surface treatment was prepared in the same manner as in embodiment 1, except that the content of each component was changed as shown in Table 1 below. At this time, the purity of the fluorosilicic acid in the composition was 41.65 wt % of the total composition.

Embodiment 5

A composition for surface treatment was prepared in the same manner as in embodiment 1, except that the content of each component was changed as shown in Table 1 below. At this time, the purity of the fluorosilicic acid in the composition was 40.92 wt % of the total composition.

Embodiment 6

A composition for surface treatment was prepared in the same manner as in embodiment 1, except that the content of each component was changed as shown in Table 1 below. At this time, the purity of the fluorosilicic acid in the composition was 40.81 wt % of the total composition.

Embodiment 7

A composition for surface treatment was prepared in the same manner as in embodiment 1, except that the content of each component was changed as shown in Table 1 below. At this time, the purity of the fluorosilicic acid in the composition was 40.73 wt % of the total composition.

Comparative Examples 1 to 3

Compositions for surface treatment were prepared by changing the contents of the components as shown in Table 2 below. In the compositions according to Comparative Examples 1 to 3, unlike in embodiment 1, hydrofluoric acid (HF) has not been added to the initial composition, and impurities such as silicon oxide (SiOx) in excess of at least 0.2 wt % are contained in the composition.

Experimental Example 1

$Si_{total}$ was calculated using an Inductively Coupled Plasma (ICP) luminescence analysis. A PerkinElmer Avio 500 ICP Optical Emission Spectrometer was used for analysis.

$Si_{hydro}$ was calculated by Equation 2 below.

$Si_{hydro}$={Content of fluorosilicic acid in the composition(%)}*Si atomic weight/molecular weight of fluorosilicic acid ($H_2SiF_6$)  [Equation 2]

The calculated $Si_{hydro}$ was divided by $Si_{total}$ to derive the value calculated by Equation 1.

Experimental Example 2: Measurement of Mean Etch Rate and Mean Etch Rate Deviation The change in etch rate over time was measured and compared.

A tempered glass measuring 20 mm×20 mm×0.33 mm (L×W×H) was etched using the compositions for surface treatment prepared in the above examples/embodiments and comparative examples. At this time, the temperature was 20° C., and the etch rate was calculated according to Equation 5 below.

$$\text{mean etch rate} = \frac{\text{average depth of glass etched in etching direction}}{\text{etch time}} \quad [\text{Equation 5}]$$

In this case, the average depth of the glass was calculated using a digimatic indicator (MITUTOYO/ID-C112X, 1 μm) and the method described in ① to ④ below.
① Measure the initial thickness of a total of N points by arbitrarily dividing the surface of the prepared ultra-thin glass into N equal parts, and average them to calculate the average thickness.
② place the surface treatment composition in a polyethylene (PE) container and add the substrate. The substrate may be placed while being held in a jig of a specific size so that one side of the glass does not touch the bottom of the container.
③ After a predetermined 'etch time', measure the thickness of N points after etching the glass and average them to calculate the average thickness.
④ Record the total reduced average thickness as the average depth of the glass.

The etch rate when the etch time was 10 minutes was named an 'initial mean etch rate,' and when 120 minutes, a 'late mean etch rate.'

The deviation between the initial mean etch rate and the late mean etch rate was calculated and recorded according to Equation 6 below.

$$\text{mean etch rate deviation} = \sqrt{\frac{(\text{initial mean etch rate} - \text{late mean etch rate})^2}{\text{initial mean etch rate}}} \quad [\text{Equation 6}]$$

Experimental Example 3: Measurement of Late Upper Portion Etch Rate and Upper Portion Etch Rate Deviation The deviation between the etch rate of the entire glass and the etch rate of the upper portion of the glass was calculated.

The late upper portion etch rate was calculated in the same way as the late mean etch rate in experimental example 2, except that the surface of the ultra-thin glass from which the average thickness was calculated was changed to the upper portion of the glass.

The late mean etch rate was calculated by the same method as in experimental example 2.

The deviation between the initial mean etch rate and the late upper portion etch rate was calculated and recorded according to Equation 7 below.

$$\text{upper portion etch rate deviation} = \sqrt{\frac{(\text{late mean etch rate} - \text{late upper portion etch rate})^2}{\text{late upper portion etch rate}}} \quad [\text{Equation 7}]$$

Experimental Example 4: Measurement of Late Lower Portion Etch Rate and Lower Portion Etch Rate Deviation The deviation between the etch rate of the entire glass and the etch rate of the lower portion of the glass was calculated.

The late lower portion etch rate was calculated in the same way as the late mean etch rate in experimental example 2, except that the surface of the ultra-thin glass from which the average thickness was calculated was changed to the lower portion of the glass.

The late mean etch rate was calculated by the same method as in experimental example 2.

The deviation between the initial mean etch rate and the late lower portion etch rate was calculated and recorded according to Equation 8 below.

$$\text{lower portion etch rate deviation} = \sqrt{\frac{(\text{late mean etch rate} - \text{late lower portion etch rate})^2}{\text{late lower portion etch rate}}} \quad [\text{Equation 8}]$$

TABLE 1

|  |  | Embodiment 1 | Embodiment 2 | Embodiment 3 | Embodiment 4 | Embodiment 5 | Embodiment 6 | Embodiment 7 |
|---|---|---|---|---|---|---|---|---|
| composition | fluorosilicic acid content (wt %) | 41.76 | 41.92 | 41.60 | 41.65 | 40.92 | 40.81 | 40.73 |
|  | hydrofluoric acid content (wt %) | 0.38 | 0.37 | 0.41 | 0.44 | 0.21 | 0.58 | 0.2 |
| Experimental example 1 | $Si_{hydro}$(ppm) | 81,381 | 81,692 | 81,069 | 81,166 | 79,744 | 79,529 | 79,373 |
|  | $Si_{total}$(ppm) | 81,621 | 82,150 | 81,192 | 81,500 | 80,109 | 79,954 | 79,651 |
|  | Equation 1 | 0.997 | 0.994 | 0.998 | 0.996 | 0.995 | 0.995 | 0.996 |
| Experimental example 2 | initial mean etch rate (μm/min) | 0.435 | 0.429 | 0.436 | 0.438 | 0.421 | 0.437 | 0.425 |
|  | late mean etch rate (μm/min) | 0.425 | 0.418 | 0.420 | 0.421 | 0.413 | 0.418 | 0.420 |
|  | mean etch rate deviation(%) | 2.3 | 2.6 | 3.7 | 3.9 | 1.9 | 4.34 | 1.2 |
| Experimental example 3 | late upper portion etch rate (μm/min) | 0.435 | 0.430 | 0.435 | 0.437 | 0.420 | 0.438 | 0.425 |
|  | upper portion etch rate deviation(%) | 2.3 | 2.8 | 3.4 | 3.7 | 1.7 | 4.6 | 1.2 |
| Experimental example 4 | late lower portion etch rate (μm/min) | 0.415 | 0.407 | 0.407 | 0.406 | 0.406 | 0.402 | 0.414 |
|  | lower portion etch rate deviation(%) | 2.4 | 2.7 | 3.2 | 3.7 | 1.7 | 4.0 | 1.4 |

TABLE 2

|  |  | comparison example 1 | comparison example 2 | comparison example 3 |
|---|---|---|---|---|
| composition | fluorosilicic acid content (wt %) | 40.43 | 40.13 | 40.87 |
|  | hydrofluoric acid content (wt %) | 0.77 | 0.81 | 0.43 |
| Experimental example 1 | $Si_{hydro}$(ppm) | 78,789 | 78,204 | 79,646 |
|  | $Si_{total}$(ppm) | 98,695 | 98,701 | 102,140 |
|  | Equation 1 | 0.798 | 0.792 | 0.780 |
| Experimental example 2 | initial mean etch rate (μm/min) | <0.1 | <0.1 | <0.1 |

From the above results, it could be verified that the compositions for surface treatment according to embodiments 1 to 7 had a value of 0.80 or more, more specifically 0.99 or more, as calculated according to Equation 1, which led to a high etch rate and resultant fast surface treatment.

It could also be verified that the compositions for surface treatment according to embodiments 1 to 7 showed a small etch rate deviation over time (experimental example 2) and a small etch rate deviation depending on the position of the substrate (experimental examples 3 and 4).

In contrast, it could be verified that the compositions for surface treatment according to comparative examples 1 to 3 had a value of less than 0.80 as calculated according to Equation 1 which resulted in slow surface treatment.

What is claimed is:

1. A composition for surface treatment of a substrate, the composition comprising:
   from about 30-50 wt. % fluorosilicic acid ($H_2SiF_6$);
   inorganic acid other than hydrofluoric acid; and
   hydrofluoric acid (HF), wherein a value calculated by Equation 1 below is 0.80 or more:

$$Si_{hydro}/Si_{total} \qquad \text{[Equation 1]}$$

where in Equation 1, $Si_{total}$ is a total content (ppm) of silicon (Si) in the composition, and
   $Si_{hydro}$ is a content (ppm) of the silicon (Si) derived from the fluorosilicic acid;
   wherein a content of the inorganic acid in the composition is 1 wt % or less with respect to the total composition.

2. The composition of claim 1, wherein $Si_{hydro}$ is calculated by Equation 2 below:

$$Si_{hydro}=\{\text{Content of fluorosilicic acid in the composition(\%)}\}*Si\text{ atomic weight/molecular weight of fluorosilicic acid}(H_2SiF_6) \qquad \text{[Equation 2]}$$

3. The composition of claim 1, wherein the content of hydrofluoric acid (HF) is from about 0.1 wt % to 1 wt % with respect to the total composition.

4. The composition of claim 1, wherein the inorganic acid includes a first inorganic acid including sulfuric acid.

5. The composition of claim 1, wherein the inorganic acid includes a second inorganic acid selected from the group consisting of nitric acid, hydrochloric acid, and phosphoric acid.

6. The composition of claim 1, wherein a pH of the composition is from 2 to 6.5.

7. A method for surface treatment, the method comprising contacting the composition for surface treatment of claim 1 with a substrate.

8. The method of claim 7, wherein the substrate includes glass.

9. The method of claim 7, wherein a physical thickness of the substrate is 20 μm or more and 300 μm or less.

10. The method of claim 7, further comprising etching the substrate.

11. The method of claim 10, wherein an etch rate represented by Equation 3 below in etching the substrate is 0.1 μm/min to 1 μm/min:

etch rate=(etched depth of substrate etched in etching direction)/(etch time)     [Equation 3]

wherein in Equation 3, a depth of the substrate etched in an etching direction is a difference between a thickness of the substrate before etching and a thickness of the substrate after etching.

12. The method of claim 10, wherein an etch rate deviation represented by Equation 4 below in etching the substrate is 5% or less:

etch rate deviation={(early etch rate−late etch rate)/(early etch rate)}/(early etch rate)*100(%)     [Equation 4]

wherein in Equation 4 above, the early etch rate is the etch rate, 10 minutes after the substrate etching starts, and the late etch rate is the etch rate, 120 minutes after the substrate etching starts.

\* \* \* \* \*